United States Patent [19]
Dotson

[11] Patent Number: 4,954,300
[45] Date of Patent: Sep. 4, 1990

[54] GLASS REPAIR METHOD AND APPARATUS

[75] Inventor: Jimmy R. Dotson, Balch Springs, Tex.

[73] Assignee: John E. Vandigriff, Lewisville, Tex.

[21] Appl. No.: 366,757

[22] Filed: Jun. 14, 1989

[51] Int. Cl.⁵ ............................................. B32B 35/00
[52] U.S. Cl. ..................................... 264/36; 156/94; 156/499; 425/12; 425/13; 428/63
[58] Field of Search ................. 156/94, 499; 126/413; 219/229, 233, 240; 264/36; 228/51; 425/12, 13; 428/63

[56] References Cited
U.S. PATENT DOCUMENTS

| | | | |
|---|---|---|---|
| 2,807,317 | 9/1957 | Penno | 126/413 |
| 3,562,366 | 2/1971 | Sohl | 264/23 |
| 3,899,654 | 8/1975 | Walton | 228/51 X |
| 3,993,502 | 11/1976 | Werner et al. | 156/94 |
| 4,303,825 | 12/1981 | Jaronen | 219/240 X |
| 4,744,841 | 5/1988 | Thomas | 156/94 X |
| 4,814,185 | 3/1989 | Jones | 425/12 |

*Primary Examiner*—Robert A. Dawson
*Attorney, Agent, or Firm*—John E. Vandigriff

[57] ABSTRACT

An apparatus and method for repairing cracks and chips in automobile windshields provides an injector that heats repair chemical prior to inserting the repair chemical into the crack and also heats the windshield prior to inserting the repair chemical into the crack.

16 Claims, 5 Drawing Sheets

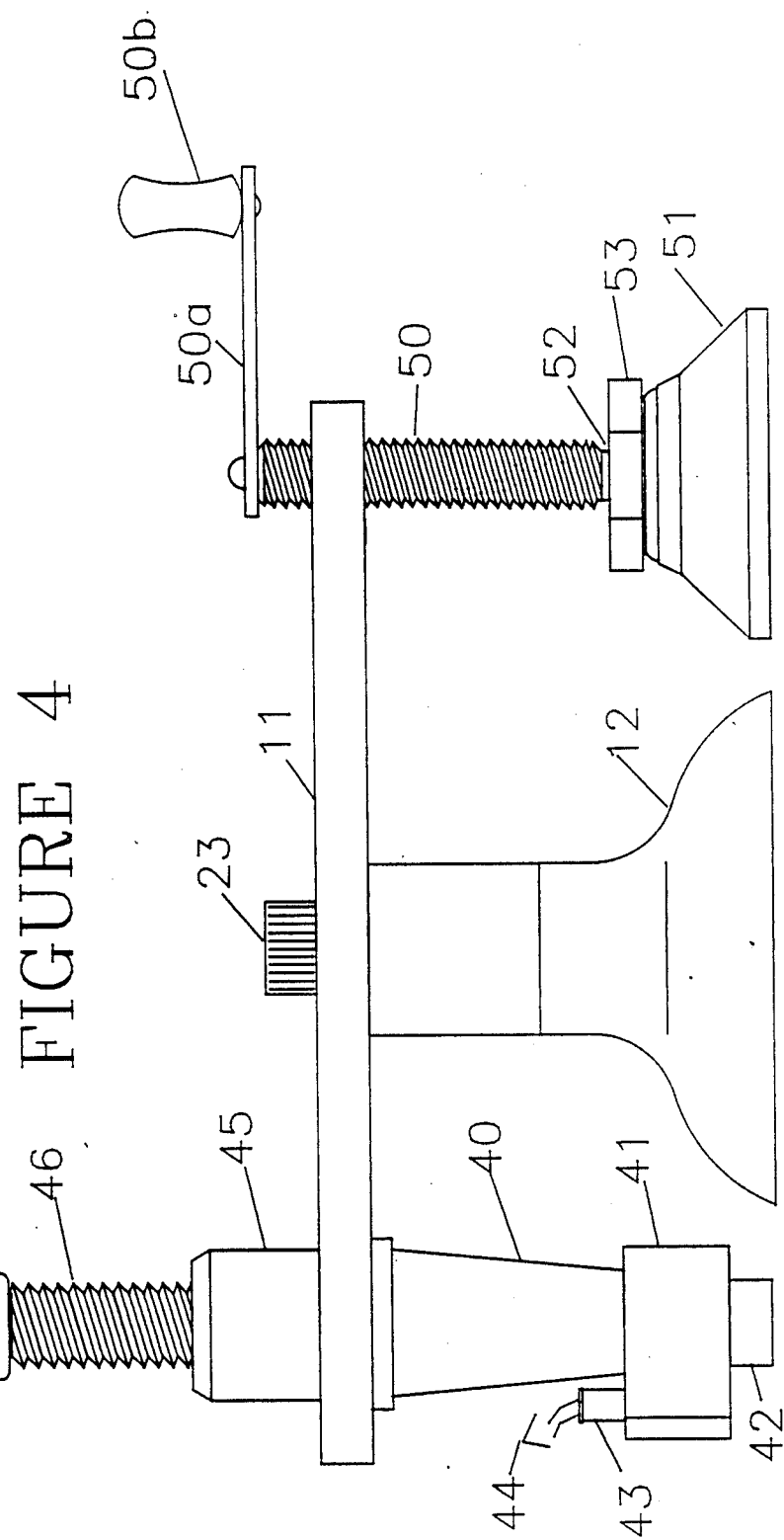

GLASS REPAIR METHOD AND APPARATUS

FIELD OF THE INVENTION

This invention relates to glass repair methods and apparatus and more particularly to an improved method and apparatus for repairing chipped or cracked automobile glass.

BACKGROUND OF THE INVENTION

The repair of small holes and cracks in glass, particularly automobile windshield glass is accomplished by filling the holes or cracks with a clear resin or epoxy type chemical to remove the air from the space created by the holes or cracks. When a stone or other object strikes a windshield, it generally produces a small surface chip. The repair chemical is usually an ultraviolet curable material. The majority of the damage is below the surface in the form of a cone-shaped piece of glass between the inter polybutyl layer and the outer layer of glass. Small amounts of air are trapped in the cracks. The air causes a refraction of the light passing through the glass. The object of glass repair is to remove the trapped air and fill the void with a clear material to stop the refraction of light and to stop the spread of the break.

Basic repair is accomplished by placing a bridge device on the windshield. On one end of the bridge is an injector which is centered over the break. The center of the bridge has a suction cup which holds the bridge in place. The other end of the bridge usually has an adjustable screw to press against the windshield and to rock and hold the injector against the windshield. Repair chemical is placed in the injector and then a screw is turned down slowly to force the chemical into the break. Care must be taken as excessive force of the chemical will cause any crack in the glass to creep or cause a flowering effect in the break, extending cracks across the windshield.

BRIEF SUMMARY OF THE INVENTION

The invention is to an improved apparatus and method for repairing glass holes and cracks in automotive windshields. The apparatus is an elongated bridge with a centrally located suction cup. On one end is an adjustable member that is contoured or constructed to adjust to the curvature of a windshield. On the other end of the bridge is an injector for applying chemical to the holes and cracks in the windshield. The injector has a heating element around or adjacent to an injection nozzle. Power to the heating element may be either by portable battery or may be connected to the automobile battery by clips, or by plugging it into a cigarette lighter.

Attached to the top of the injector is a plunger mechanism that is attached to the injector after chemical has been placed in the injector. The plunger mechanism may be of a type to screw into the injector or of a type to snap lock onto the top of the injector by a twist lock. The plunger is spring loaded and may be pushed downward to apply the desired degree of pressure to the chemical, and then turned to place the plunger handle into a lock slot to hold the plunger in place, and maintain pressure on the chemical.

The improved method for repairing breaks in automobile glass includes the steps of placing the injection fixture onto the windshield and securing it there with the section cup. The fixture is then adjusted with a contour adjustable mechanism to firmly press the nozzle end over the break to adjust the fixture to the curvature of the windshield. Current is applied to the nozzle heating element to heat the chemical therein.

Concurrently, with applying heat to the chemical in the injector, heat is applied to the surface of the windshield to prevent any coolness of the windshield from slowing the flow of chemical and to cause the glass to expand, helping to seal the crack in the glass and to prevent further cracking of the glass.

Pressure is applied to the chemical to force it into the hole or crack. The plunger is locked in place to maintain pressure on the chemical until it begins to set by exposure to ultraviolet light. In the event there is an air bubble in the chemical, the plunger may be slowly released to create a vacuum in the nozzle to draw the air bubble out of the break and/or chemical. When the air bubble is removed, pressure than may be reapplied to the chemical.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 2a is a cross sectional view of a sealing element over an injection nozzle;

FIG. 4 is a side view of a fixture having a different fixture stabilizer;

DESCRIPTION OF A PREFERRED EMBODIMENT

The invention and its various aspects are illustrated in several figures. Where parts of the invention are similar or identical in the various figures, the same identification numbers are used for the similar or identical parts.

Figure 1:
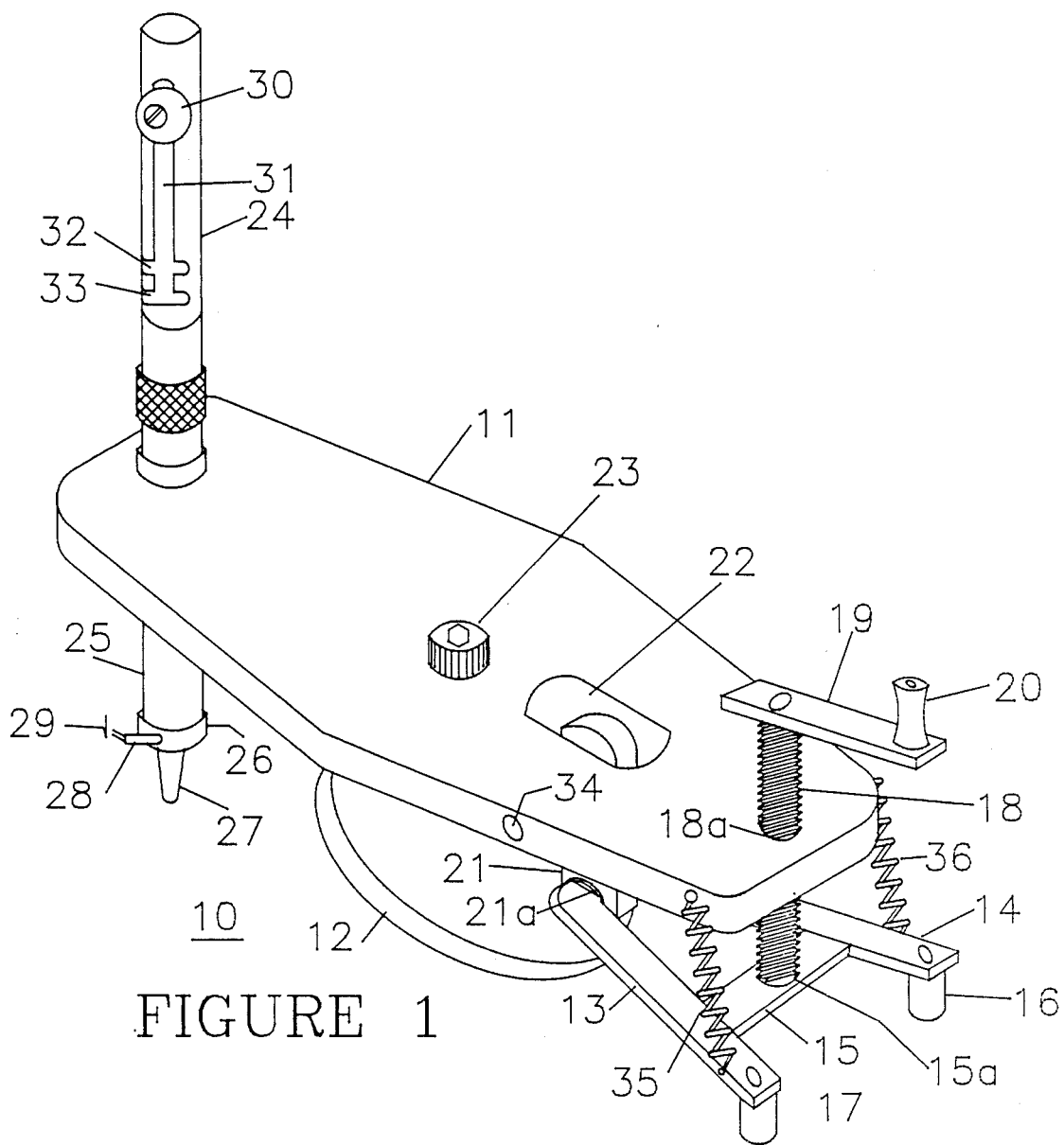
FIG. 1 is an isometric view of a glass repair fixture according to the present invention.

FIG. 1 illustrates a glass repair fixture useful in the repair of chipped or cracked automobile glass. Bridge 11 is mounted on a suction cup 12 and attached thereto by bolt 21. A stabilizer mechanism is mounted on one end of the bridge.

The stabilizer mechanism, includes two legs 13 and 14, is pivotally attached to a vertical member 21 which is attached to the bridge 11 in slot 22. Legs 13 and 14 each engage an O-ring washer 21a to provide an adjusting connection of each leg to member 21 so that the legs may adjust readily to the curvature of the windshield on which the apparatus is mounted. Each leg 13 and 14 has a plastic or rubber foot attached thereto (16 and 17). The two legs 13 and 14 are connected together by support 15.

The stabilizer mechanism is used to stabilize the fixture when it is mounted on an automobile windshield and to force chemical nozzle 27 into engagement with the windshield and to hold the nozzle firmly against the windshield during repair.

Legs are adjusted by screw 18 which passes through bridge 11 via threaded hole 18a and is attached to support 15 via a pivotal connection in hole 15a. The pivotal connection allows the stabilizer mechanism legs 13 and 14 to adjust to the curvature of the windshield. To retract legs 13 and 14, as screw 18 is turned upwardly by handle 19 and knob 20, two springs 35 and 36 are connected to the legs and the bridge.

On the end of bridge 11, opposite the end on which the stabilization mechanism is mounted, is mounted the chemical injector mechanism used to inject repair chemical into the chip or crack in the windshield. The injector has two major parts, upper part 24 and lower part 25. Lower part 25 includes a nozzle 27 which is placed over th chip or crack. Nozzle 27 is hollow and is used to inject repair chemical in to the damaged area. Around nozzle 27 is a heat transfer collar 26 and heater 28. Heater 28 and collar 26 are used to heat the repair chemical as it passes through the nozzle. The repair chemical is heated from about 75 degree F. to about 150 degrees F. to lower the viscosity of the repair chemical and to allow it to flow smoothly and thoroughly through the cracked area. Heater 28 is attached to a power source by wires 29. The power source may be a portable battery or the automobile battery.

The upper part 24 of the injector is removable from the bottom part 25 so that repair chemical may be placed in the injector. In place, the upper part of the injector is used to force the chemical from the injector, through the nozzle, into the area to be repaired.

Figures 5A, 5B:
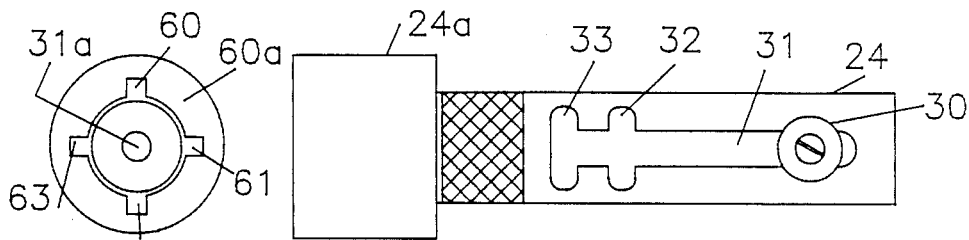
FIGS. 5a and 5b are an end and side view of the top end of an injector.
Figure 5C:
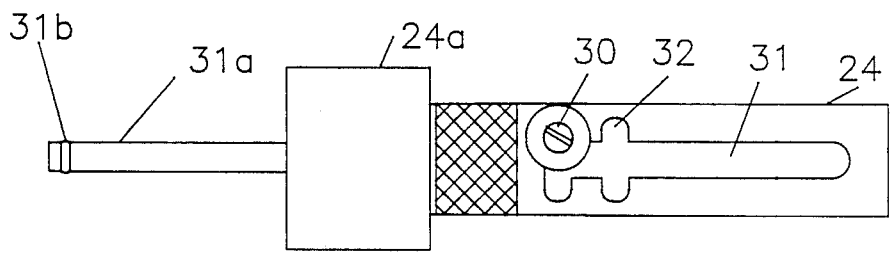
FIG. 5c shows the top end of an injector with the plunger rod extended.
Figures 6A, 6B:
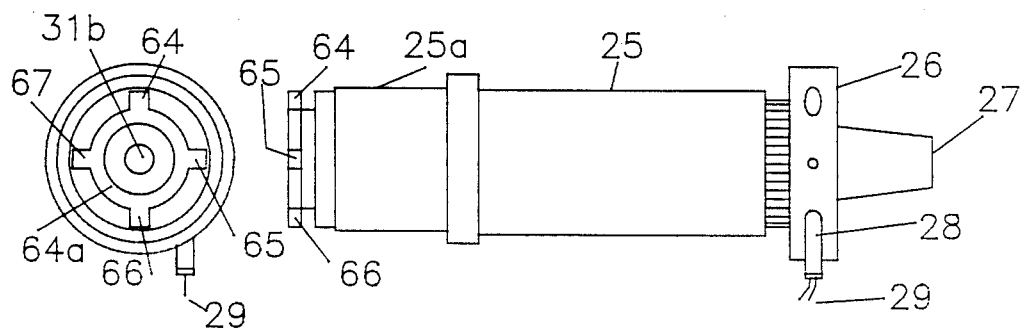
FIGS. 6a and 6b are an end and side view of the bottom end of an injector.

Injector upper part 24 has a plunger 31b (FIGS. 5c and 6a) which is forced downward by placing a downward force on knob 30. Knob 30 is moved downward in slot 31 and is locked in a downward position by placing knob 30 in either slot 32 or 33. The plunger and knob 30 are spring loaded so that when know 30 is not locked in one of slots 32 and 33, it will return to the upper position as illustrated in FIG. 1. Only two slots 32 and 33 are illustrated, but more slots may be positioned along slot 31 so that varying amounts of downward pressure may be applied to the repair chemical by the plunger.

Figure 2:
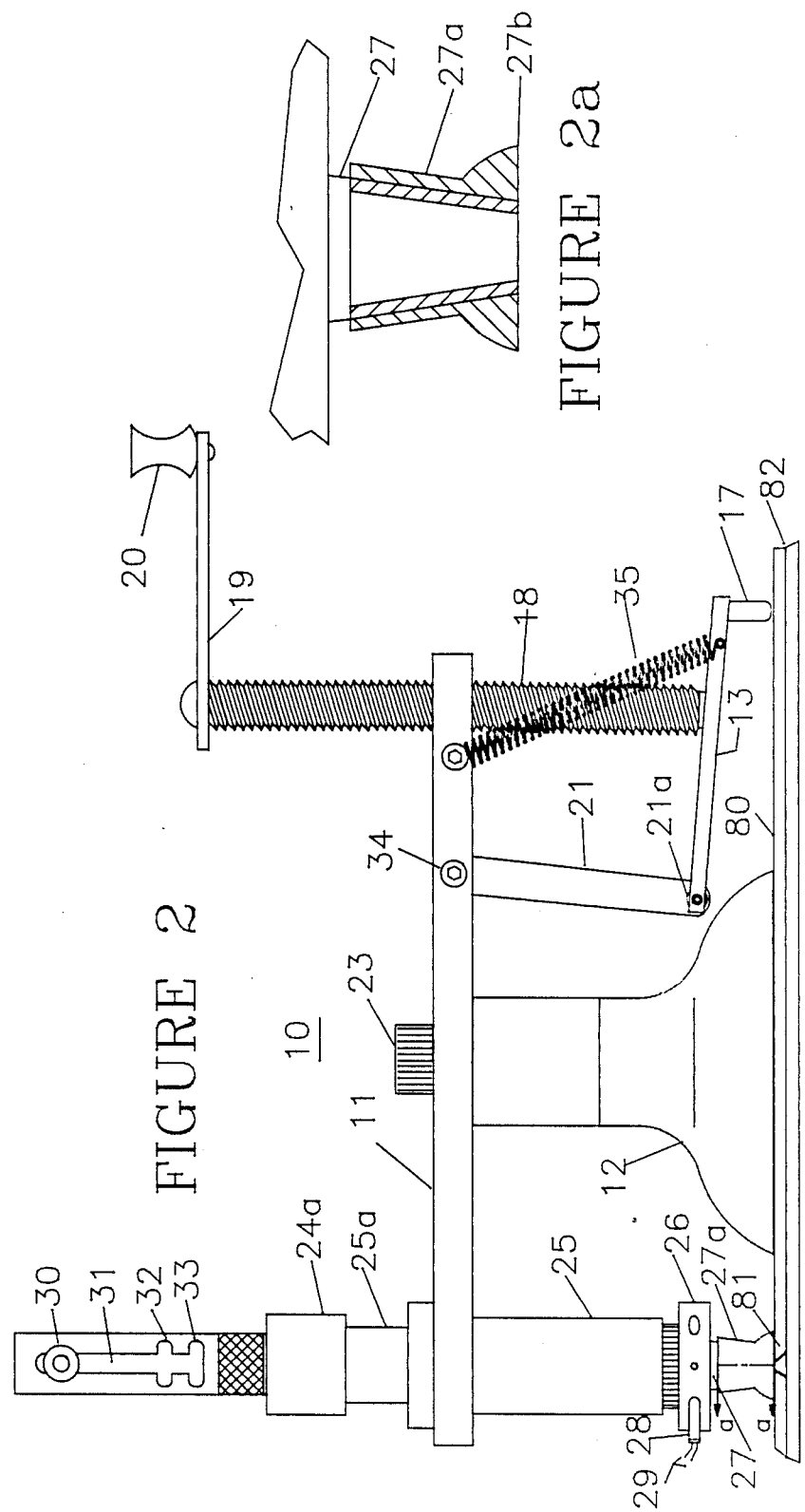
FIG. 2 is a side view of the fixture illustrated in FIG. 1.

FIG. 2 is a side view of the repair fixture illustrated in FIG. 1. Fixture 10 is positioned over windshield 80 with nozzle 27 positioned over damaged area 81 which extends from the surface of the glass to the polybutyl layer.

Fixture 10 is pressed against glass 80 and held there by suction cup 12. Screw 18 is turned to move feet 16 and 17 into engagement with the glass. The force of feet 16 and 17 against the glass rocks fixture 10 to push nozzle and seal element 27a thereon (See FIG. 2a) into engagement with glass 80 over break 86 so that repair chemical can be injected into crack 81 without spreading over the surface of windshield 80. Seal element 27a is placed over injector nozzle to seal over the crack in the glass. FIG. 2a is a cross-sectional view of the nozzle 27 and sealing element 27a take through section a-a in FIG. 2. The sealing face 27b of seal 27a may be of different sizes to provide a seal for either large or small cracks. Seal 27a is replaceable so that damaged or worn seals may be replaced.

Figure 3:
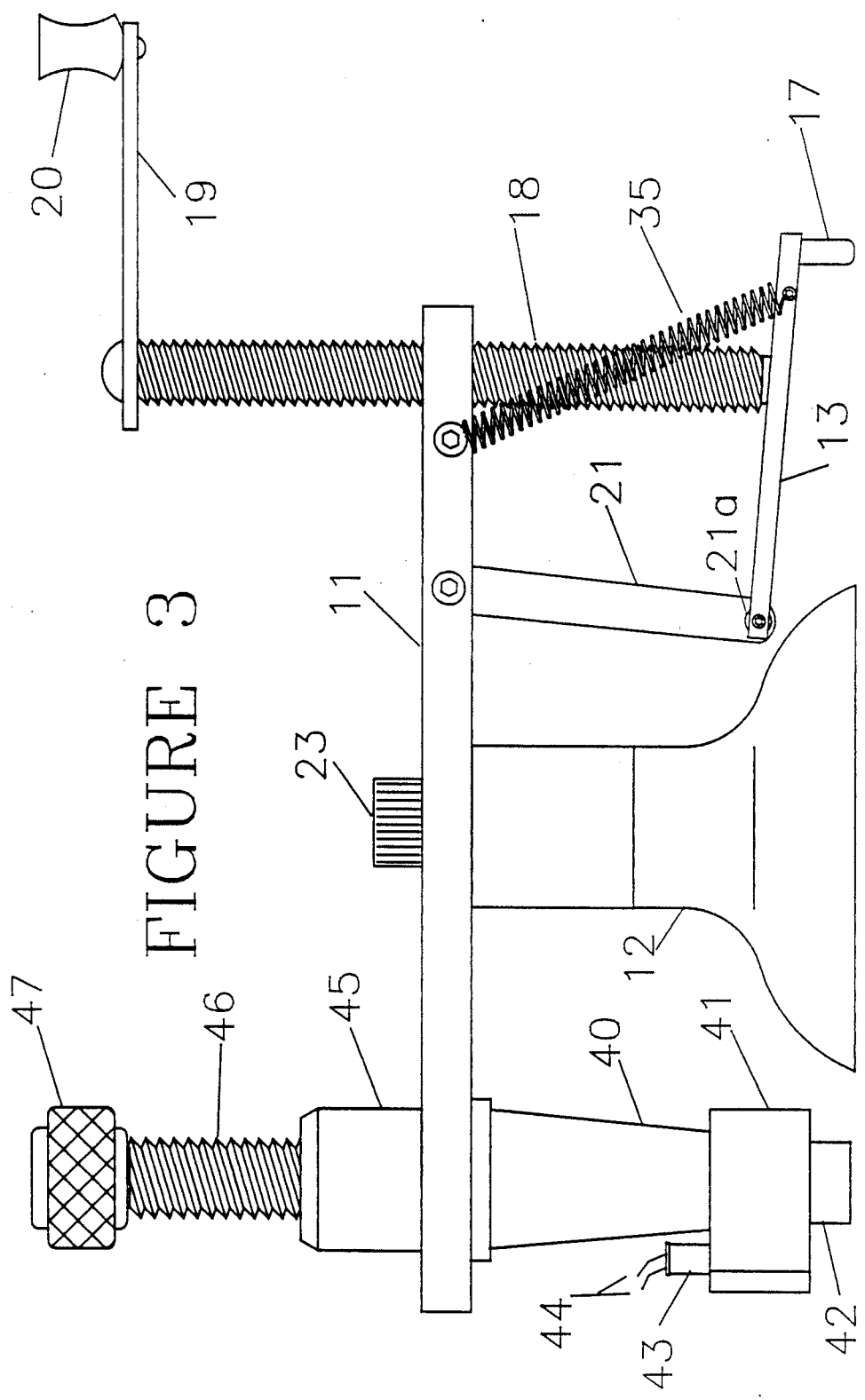
FIG. 3 is a side view of a fixture having a modified prior art injector from that illustrated in FIGS. 1 and 2.

FIG. 3 illustrates the use of a prior art injector adapted for use with the present invention. Injector 46 is mounted on bridge 11 and has a heat collar 41 and heater 43 mounted on the lower part 40 of the injector. In use screw 46 is removed by turning know 47. Repair chemical in placed in the injector and then screw is turned downward to force the repair chemical through nozzle 42. Power is applied to heater 43 by connecting wires 44. Prior art injector 45, prior to the present invention, did not use heating collar 41 and heater 43.

FIG. 4 illustrates the bridge of the present invention with another embodiment of a bridge stabilizer. The stabilizer consists of a large round foot 51 made of metal, plastic or rubber that is large enough to rest firmly against the automobile windshield with out moving or rocking. Foot 51 is attached to nut 53 and screw 50. The connection between screw 50 and nut 53 is a pivotal connection 52. This pivotal connection allows foot 51 to adjust to the curvature of the windshield. Screw 50 is threaded through bridge 11.

FIGS. 5a, 5b, 5c, 6a and 6b illustrate the preferred embodiment of the injector. The injector has an upper part 24 and a lower part 25. The two parts may be connected together by screw threads (not illustrated) or a twist-lock connection. End view FIG. 6a and side view FIG. 6b of injector bottom part 25 show a twist lock male part consisting basically of four locking fingers 64, 65, 66 and 67 located around the periphery of ring 64a. The four fingers, 64, 65, 66 and 67 mate with openings 60, 61, 62 and 73, in plate 60a on upper injector part 24a. When fingers 64, 65, 66, and 67 are inserted in slots 60-63 and then turned, the fingers 64-67 turn under plate 60a, holding the upper and lower parts of the injector together.

In operation, repair chemical is placed in opening 31b in lower injector part 25. The two injector parts are locked together. Plunger 31a (FIG. 5a) is then pushed downward by knob 30 (FIG. 5b) to force the repair chemical out nozzle 27. Plunger 31a has an O-ring 31b for sealing the injector chamber to prevent repair chemical from being forced out of the injector into the plunger chamber. The repair chemical is heated by heat collar 26 and heater 28 as it passes through nozzle 27.

Figure 7:
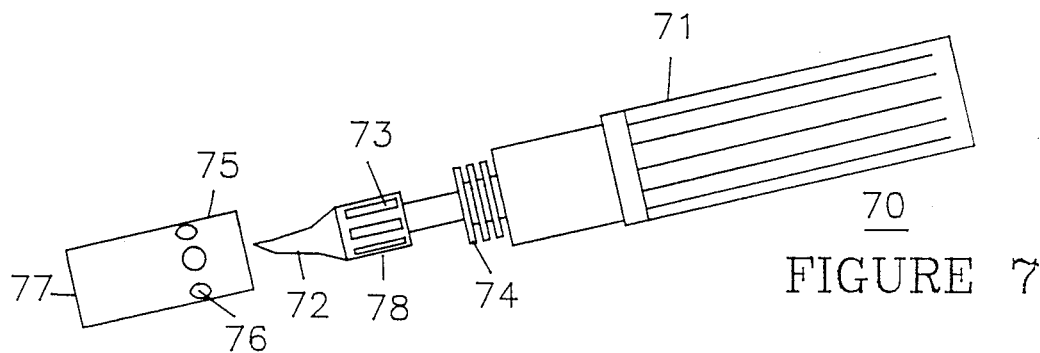
FIG. 7 illustrates a heating apparatus.

FIG. 7 illustrates an apparatus for applying heat to the surface of the windshield prior to injecting the repair chemical to reduce shock to the repair chemical which may induce premature hardening of the chemical, and to heat close any cracks extending from the center of the damaged area to prevent creep or flowering of the damaged area. The repair chemical flows toward the end of the crack, and as the glass cools, the crack ends open slightly to allow the repair chemical to enter and fill the crack. The windshield may be heated in the range of 150 degrees F. to 250 degrees F., which temperature closes the crack temporarily and removes moisture.

Apparatus 70 is a propane or butane portable soldering iron. Handle 71 houses a gas cartridge, not illustrated. Gas flows into combustion chamber 78 and heats tip 72. Air flow to the combustion chamber is through slots 73. Cooling fins 74 help reduce heat flow to handle 71. The gas soldering iron is available commercially. An electric heating element may also be used.

Heat transfer element 75 is a part or accessory that is not available commercially, but was designed for the specific purpose described herein. The heat transfer element may be made, for example, of aluminum, brass, copper or other heat transferable material, and is placed over combustion chamber 78 and tip 72, and is used to apply heat to the windshield. Heat transfer element 75 has holes 76 in the sides thereof to allow air flow to combustion chamber 78. In use, heat transfer element end 77 is placed in contact with the area of the windshield around the damaged area on the windshield to heat the damaged area, to remove water or water vapor from the damaged area, and to prevent creep or flowering of the damaged area. The heating apparatus can also be used to heat the area to be repaired during cold and damp weather to ensure a successful repair. The heating apparatus ensures that repairs can be made on locations where electric power is not available.

What is claimed:

1. A method for repairing chips and cracks in windshields by injecting a repair chemical into the chip or crack that cures to a clear state, comprising the steps of:
    affixing an apparatus holding an injector mechanism firmly against the windshield such that an end of the injector covers the chip or crack;
    filling the injector with the repair chemical;
    heating the repair chemical to a temperature from about 75° F. to about 150° F. prior to injecting it into the chip or crack;
    injecting the repair chemical into the chip or crack; and
    maintaining pressure on the repair chemical for a period of time to ensure that repair chemical has completely filed the chip or crack.

2. The method according to claim 1, wherein the repair chemical is heated prior to placing it in the injector.

3. The method according to claim 1, including the step of applying heat, in the range from about 150° F. to about 250° F. to the windshield prior to injecting the repair chemical to prevent creep or flowering of the chip or crack during the injection of the repair chemical.

4. The method according to claim 3, wherein heat is applied to the outside surface of the windshield.

5. The method according to claim 1, wherein the apparatus is affixed to the windshield and contacts the windshield at four points to adjust to the curvature of the windshield to ensure a stable contact therewith.

6. An apparatus for repairing windshields by injecting a clear repair chemical into cracks in the windshield, comprising:
    a bridge, an injector, an adjustable stabilizer and suction cup; said injector mounted on one end of the bridge, said stabilizer mounted on another end of the bridge, and said suction cup mounted on the bridge between the injector and the stabilizer such that when the suction cup is secured to the windshield, the stabilizer including a vertical bar having two legs attached thereto which are adjustable to match the contour of the windshield and to move the end of the bridge on which it is mounted to cause engagement of the injector with the windshield; and
    a heating element mounted on the injector to heat the repair chemical prior to injecting it into the crack in the windshield.

7. The apparatus according to claim 6, including a removable seal element fitted over the injector.

8. The apparatus according to claim 7, wherein the seal element may be made in various sizes to accommodate sealing of cracks of various sizes.

9. The apparatus according to claim 6, wherein the injector includes a spring loaded plunger to force the repair chemical out of the injector and into the crack, and the plunger may be locked in various positions to maintain different injection pressures on the repair chemical.

10. The apparatus according to claim 6, wherein the injector may be separated into two major parts to permit filling the injector with repair chemical, and the two parts are joined and held together by a twist lock connection.

11. The apparatus according to claim 6, wherein the stabilizer has a large surface area element connected to the bridge by a screw, the connection between the large surface element and the screw is a pivotal connection to permit the large surface area element to adjust to the contour of the windshield and still provide stability to the mounted apparatus.

12. The apparatus according to claim 6, wherein the stabilizer includes two legs, each leg having a foot thereon to engage the windshield, each leg attached to the bridge with a spring, a screw and a common bar, the common bar attached between the legs and to the screw such that when the screw is turned the feet on the legs engage the windshield and move the bridge to tilt it such that the injector comes into contact with the windshield over the crack.

13. The apparatus according to claim 6, wherein the heating element is mounted in a collar around the injector.

14. The apparatus according to claim 13, wherein the heating element is powered by an automobile battery.

15. An apparatus for repairing cracks and chips in automobile windshields comprising;
    a bridge for mounting on the windshield surface;
    an injector mounted on the bridge for injecting repair chemical into the windshield crack;
    a heating element mounted on the injector for heating the repair chemical prior to injecting it into the crack; and
    a stabilizer attached to the bridge for ensuring that the bridge adjusts to the contour of the windshield, and to position the injector against the crack in the windshield.

16. The injector according to claim 15, wherein the injector has a spring loaded plunger for moving repair chemical into the crack and maintaining pressure on the repair chemical for a desired period.

* * * * *